Nov. 22, 1938.    D. Y. B. TANQUERAY    2,137,928
AUTOMATIC CONTROL OF WASHING AND OTHER MACHINES
Filed Jan. 22, 1937    8 Sheets-Sheet 4

D. Y. B. Tanqueray
Inventor
By: Glascock Downing &Seebold
Attys.

Patented Nov. 22, 1938

2,137,928

UNITED STATES PATENT OFFICE 2,137,928

AUTOMATIC CONTROL OF WASHING AND OTHER MACHINES

David Yeo Bartholomew Tanqueray, Peterborough, England, assignor to Baker Perkins Limited, Peterborough, England Application January 22, 1937, Serial No. 121,914
In Great Britain January 24, 1936

16 Claims. (Cl. 221—101)

This invention relates to automatic controls and automatic mechanism for washing or other machines or plant in reference to which it is necessary to deliver predetermined quantities of liquid at predetermined times, and the invention is more particularly concerned with electrically operated control apparatus employing a rotary electric switch having a timed rotation and adapted to establish and disestablish electric circuits for performing the various operations. For convenience hereinafter the invention will be described by way of example with reference to washing machines.

Automatic washing machines are known wherein the time of delivery of liquids to the washing machine and their quantities are controlled by a rotary electric switch, the quantity of liquid delivered being determined by the length of time the control valves of the liquid remain open. Such apparatus suffer from the defect that while when the rate of flow remains constant the measurement of the quantities of liquid required may be effected with sufficient accuracy, where the rate of flow is variable due to alterations of pressures or a fluctuation in the head of the supply, the length of time that the valves controlling the flow of liquid remain open is not a sufficiently accurate measure of the actual quantity of liquid delivered.

An object of the present invention is to provide a method and means whereby predetermined quantities of liquid may be delivered to the washing machine with sufficient accuracy independently of variations which may occur in the rate of flow of the supply.

A further object of the invention is to provide a rotary electric switch adapted to control both functions dependent on a time factor and those dependent upon the measurements of quantity.

The invention consists in a multiple drive for a rotary control device for the operations of a washing machine or the like whereby operations are initiated under the control of one of the drives while said operations are terminated under the control of said drive or another of the drives.

The invention also consists in the opening of a valve (or valves) in an automatic control for a washing machine or the like, at predetermined times for initiating the supply of liquid to the machine by means actuated from a rotary control device and determining the time of closure of said valve by said control device according to the rate of flow of the liquid through a meter.

A feature of the invention consists in driving the rotary control device from a motor at a predetermined time rate for effecting the initiation of the delivery of liquids and, if desired, for those operations of the washing machine or the like which can be adequately controlled by a time factor, and then driving the rotary control device after the initiation of the flow of liquid to be supplied to the washing machine or the like by a flow meter or other measuring device, so that the flow to the washing machine is terminated not after a predetermined time or period but upon the passage or measurement of the predetermined quantity of liquid required.

The invention may be applied to the control of hot and cold water of the washing machine, the control of soap solution, soda, blue, bleach or other liquids, to be supplied to the washing machine, and the other actions on which the washing operation depends. For example, the electric switch may control the opening and closing of the main outlet valve of the washing machine either according to a time factor or the opening of the valve may be effected at a predetermined time and closed after the washing machine is emptied as detected by a float or other device actuated on the cessation of flow from the machine. The operations for controlling the rotation of the washing drum or any other manipulative operation may also be embodied in the switch according to known principles.

A convenient embodiment of the invention is illustrated in the accompanying drawings in which:—

Figure 1:
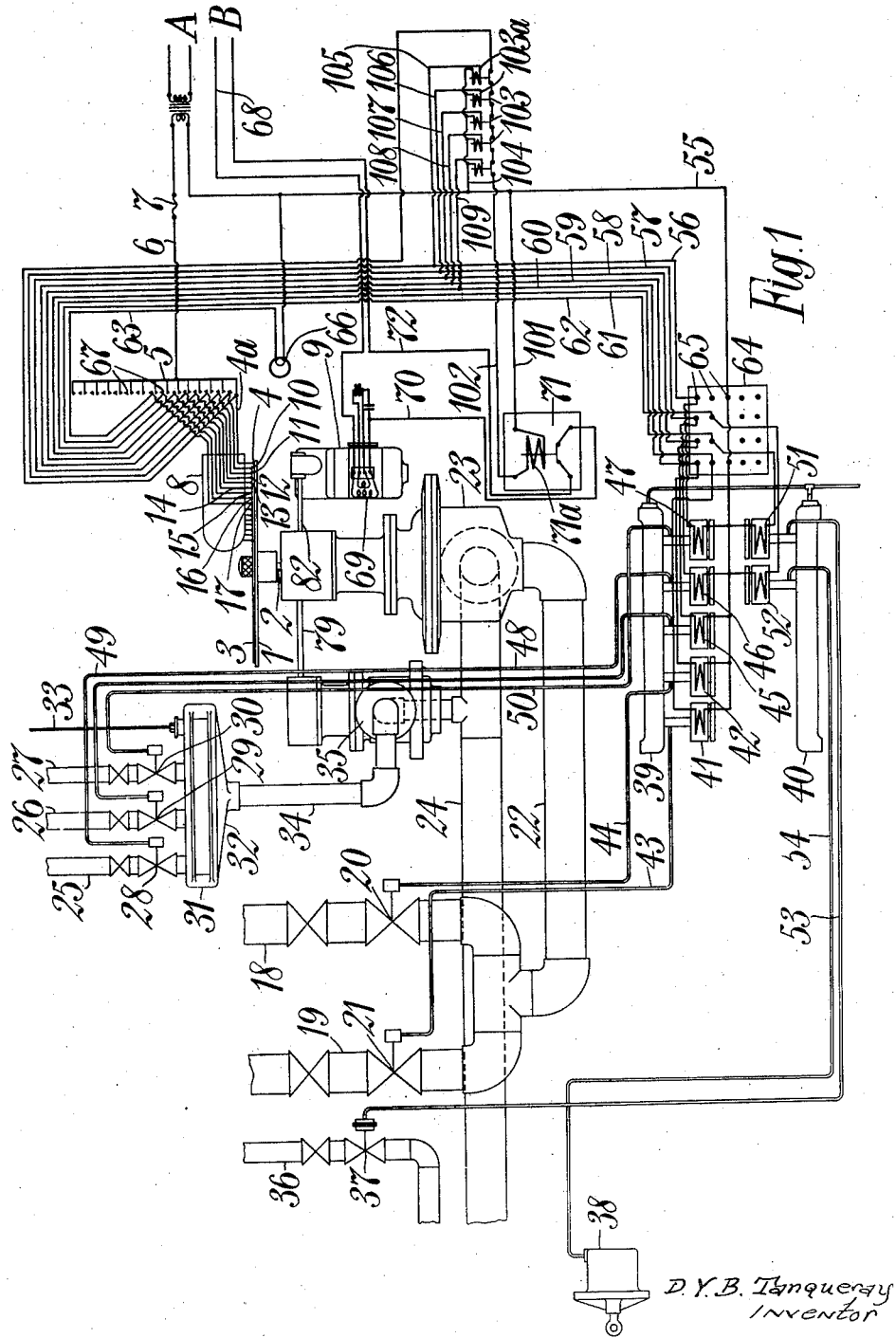
Figure 1 is a diagrammatic view of an automatic control for a washing machine.

In carrying the invention into effect according to one convenient mode as applied by way of example to an automatic control for washing machines, a gauge disc or contact plate 1 is mounted on a spindle 2 for rotation about an axis and is adapted to receive a well known perforated or slotted record card 3, the slots or perforations of which are of predetermined position and circumferential length according to the nature and cycle of operations to be performed. The contact plate is wired to constitute a common terminal of the electric circuits involved in the controlling operations such as referred to hereinafter. As shown in Figure 1 the contact plate is connected, conveniently by means of a finger terminal or brush 4, through wire 4a, switch plate 5 and wire 6, which may include a fuse 7, to one side of a source of current supply A.

Co-operating with the slotted card 3 is a radial arm 8 between which and the card rotary relative movement is established, in the embodiment described, by rotating the contact plate. The contact plate 1 is driven either by an electric motor 9 adapted to rotate the plate at a predetermined rate or by a flow meter or other measuring device as described hereinafter. The radial arm 8 carries a plurality of finger terminals or contacts 10 to 17 wired in the circuits of the various devices to be controlled with which they are associated. These fingers are adapted to establish the various electric circuits with the plate 1 through the respective slots in the record card 3.

In the embodiment shown in the drawings there is a supply pipe 18 for cold water and a supply pipe 19 for hot water, these supply pipes having motor or relay operated supply valves 20 and 21 respectively and join in a common supply pipe 22 leading to a flow meter 23 of the positive displacement type. The pressure of water from the hot or cold supply is adapted to actuate the meter as it passes therethrough to a delivery pipe 24 leading to the washing machine (not shown).

Supply pipes 25, 26 and 27 are also shown for delivering respectively soap solution, soda and blue, these pipes being also provided with motor or relay operated control valves 28, 29 and 30 respectively. The supply pipes 25, 26 and 27 lead to a common manifold 31, conveniently having a glass front 32 and an air vent 33, from which the solutions are adapted to be delivered through a common pipe 34 in which another, but preferably smaller, meter 35 is located so that the flow of liquid from the supply pipes 25, 26 and 27 may actuate this meter 35 as it passes therethrough to the delivery pipe 24 previously referred to.

For delivering steam to the washing machine a steam supply pipe 36 is provided which supply pipe may be adapted to deliver directly to the washing machine and is provided with a motor or relay operated control valve 37. A motor or relay operated outlet valve or ram is shown at 38.

The control valves for the water, solutions, steam and the outlet ram may be of known type which are adapted to be opened by fluid under pressure supplied from headers or manifolds 39 and 40, the supply of fluid or air under pressure to these valves being under control of magnetic control valves, which may also be of known type and which are in turn controlled by the electric circuits established under control of the rotary switch comprising the contact plate 1, the slotted record card 3 and the finger terminals 10 to 17.

As shown, there are magnetic control valves 41 and 42 respectively for controlling the delivery of fluid under pressure to the hot and cold water supply valves 21 and 20 through conduits 43 and 44, magnetic control valves 45, 46 and 47 for controlling delivery of fluid under pressure respectively to the soda, soap and blue supply valves 29, 28 and 30 through conduits 48, 49 and 50, and magnetic control valves 51 and 52 for respectively controlling the delivery of fluid under pressure to the steam supply valve 37 and the outlet ram 38 through conduits 53 and 54. One side of each of the solenoids of the magnetic control valves 41, 42, 45, 46, 47, 51 and 52 is wired to one side of the current supply A through a common wire 55 while the other side of each of the solenoids is wired to one of the finger terminals 10 to 16. Thus the solenoid of magnetic valve 47 is connected to finger terminal 10 by wire 56; that of magnetic valve 46 is connected to finger terminal 11 by wire 57; that of magnetic valve 45 to finger terminal 12 by wire 58; that of magnetic valve 42 to finger terminal 13 by wire 59; that of magnetic valve 41 to finger terminal 14 by wire 60, while those of magnetic valves 51 and 52 are respectively connected to finger terminals 15 and 16 by wires 61, 62. Conveniently, a panel 64 may be provided having a series of plug-in sockets 65 permanently wired to the solenoids of the magnetic valves while the wires 56 to 62 may each be provided with a jack for selectively plugging into the sockets whereby the magnetic valve which any one finger terminal 10—16 is to control may be selected by plugging the jack connected to such finger terminal in the appropriate socket 65. The finger terminal 17 is connected through wire 63 to a lamp 66 whereby a circuit may be established through the lamp, for example, to give a visible indication when a particular cycle of operations has been completed, by providing an appropriate slot in the record card 3 for co-operation with the finger terminal 17.

A series of manually operable and normally open switches 67 are provided associated with the switch plate 5 one across each of the circuits normally controlled by the rotary switch device. These manually operable switches provide a means whereby any of the operations normally controlled by the rotary switch device may if desired be effected at any time and independently of the control by the rotary switch device by simply closing the appropriate switch or switches 67 to thus manually establish the circuits controlling such operations. The circuit of motor 9 is as follows:—Supply mains B wire 68 motor winding 69, lead 70 closed contacts of motor relay switch 71 and return lead 72 to the main supply B.

From the arrangement so far described it will be appreciated that the rotary electric switch device is adapted to be driven at a predetermined time rate by the motor 9 for effecting the opening of the supply valves at predetermined times to initiate delivery of liquids and, if desired, for controlling other operations which can be adequately controlled by a time factor. However, according to the invention the closure of one or other of the liquid supply valves is effected by means dependent upon the quantity of liquid passing through one or other of the metering devices 23 or 35 or, more specifically, the rotary electric switch device after the initiation of the flow of liquid is driven by one or other of the flow meters 23 or 35, while the motor 9 is cut out so that the flow of liquid to the washing or like machine is terminated not after a predetermined time or period but upon the passage or measurement of the predetermined quantity of liquid.

Figure 2:
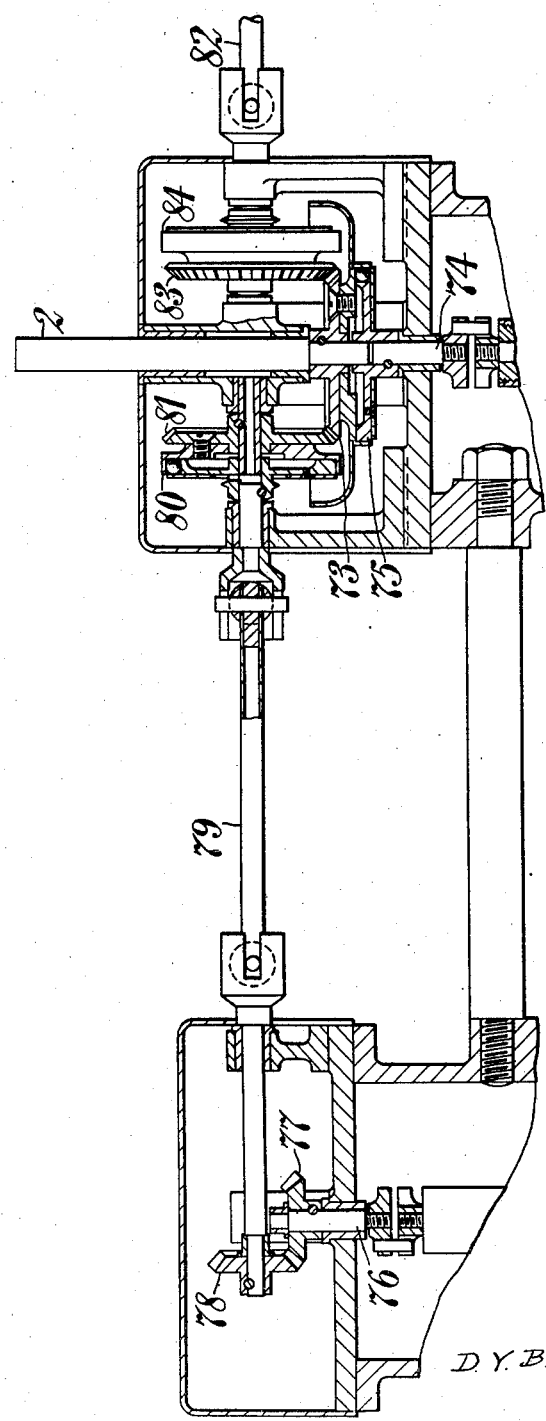
Figure 2 is a sectional view of one form of drive between the rotary disc or switch and the motor and meters.

One form of driving mechanism between the rotary switch device and the meters 23, 35 and motor 9 is shown in Figure 2. The vertical spindle 2 on which the contact plate 1 is mounted has secured thereto a bevel gear 73 adapted to be driven either by the motor 9, the meter 23 or the meter 35. The meter 23 is adapted to drive a spindle 74 through suitable reduction gearing (not shown), this spindle being in turn adapted to drive the bevel gear 73 through a free wheel clutch 75. A spindle 76 adapted to be driven through suitable reduction gearing from the meter 35 carries a bevel gear 77 which is in mesh with a bevel gear 78 secured on a shaft 79, the latter carrying one element of a free wheel clutch 80 the other element of which is secured to a bevel gear 81 which meshes with the bevel gear 73. Similarly the shaft 82 of motor 9 is adapted to drive a bevel gear 83 through a free wheel clutch 84, the gear 83 also meshing with the bevel gear 73. With this arrangement it will be appreciated tht the rotary switch may be independently driven by either the motor 9 or one or other of the meters 23 or 35 the free wheel clutches permitting this.

Figure 3:
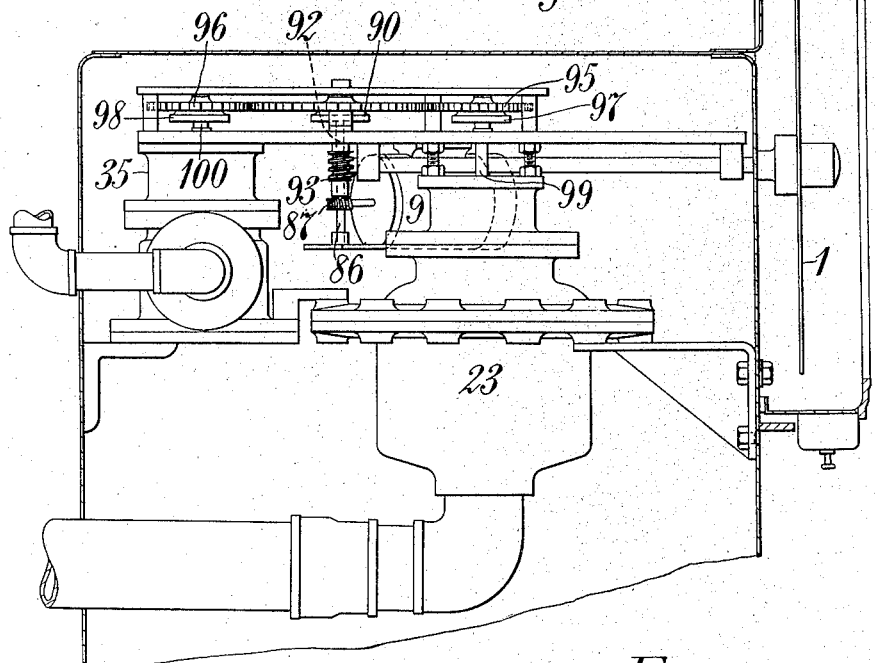
Figures 3 and 4 are elevation and plan views respectively of a modified arrangement of the drive between the rotary disc or switch and the motor and meters, parts of the casing being shown in section.
Figure 4:
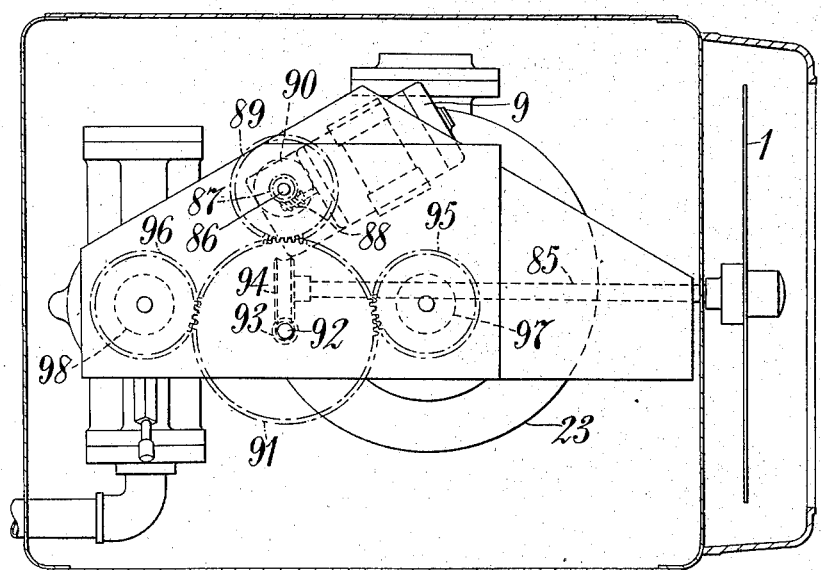

An alternative arrangement of driving mechanism between the rotary switch device and the meters and motor is shown in Figures 3 and 4. In this arrangement the contact plate or disc 1 is vertically arranged and is mounted for rotation about a horizontal axis on a horizontal shaft 85. The drive for the disc from the motor 9 is through a vertical shaft 86 having at its lower end a worm wheel 87 meshing with a worm 88 on the motor shaft. The vertical shaft 86 is adapted to drive a gear wheel 89 through a free wheel clutch 90, the gear wheel 89 in turn driving a gear wheel 91 mounted on a stub shaft 92 which has secured thereto a worm 93 meshing with a worm wheel 94 secured to the horizontal shaft 85. The gear wheel 91 is commonly in mesh with gear wheels 95 and 96 adapted respectively to be driven through free wheel clutches 97 and 98 from the respective meter shafts 99 and 100. With this alternative arrangement also, the free wheel clutches 90, 97 and 98 permit the contact plate or disc 1 to be driven by the motor 9 or by one or other of the meters 23 or 35 when the motor drive is discontinued.

Means is provided for cutting out the timed motor 9 when the rotary switch device is to be driven by one or other of the meters. As shown in Figure 1 the motor relay switch 71 is adapted to be opened to interrupt the motor circuit when any one of the circuits controlling the opening of the liquid supply valves 20, 21, 28, 29, 30 is established. The motor relay switch 71 is held closed when its coil 71a is energized by the establishment of the following circuit:—Supply mains A, wire 55, lead 101, coil 71a of motor relay switch 71, lead 102 to wire 4a, switch plate 5, and lead 6 to the other side of the supply mains A. Located in the lead 102 is a series of solenoid operated relay switches 103 which are held closed when no current is flowing through their solenoid coils 103a. One side of each of the solenoid coils is connected by common lead 104 to the wire 55 leading to one side of the main supply A while the other sides of these coils are respectively connected by wires 105 to 109 to the wires 56 to 60 leading to the finger terminals 10 to 14, whereby a circuit is established through one of the coils 103a to open its relay switch 103 and so open the motor relay switch 71 to interrupt the motor circuit whenever any one of the finger terminals 10 to 14 controlling the opening of the liquid supply valves contacts with the plate 1 through a slot in the record card.

As an example of the operation of the control described, a-suming that the appropriate record card 3 has been placed on the contact plate 1 of the rotary switch and the timed motor has been started up, the switch plate 1 and card 3 will revolve at a predetermined rate and when a slot in the record card arrives opposite the finger terminal 13, corresponding with the cold water supply, this terminal will contact the plate 1 through the slot and establish the electric circuit for effecting opening of the cold water supply valve 20 as follows:—Supply mains A; wire 6; switch plate 5; wire 4a; contact plate 1; finger terminal 13; wire 59; the coil of magnetic control valve 42; common wire 55 back to supply mains A. The magnetic control valve 42 will thus be operated to supply fluid under pressure from header or manifold 39 through conduit 44 to open the cold water supply valve 20. Simultaneously, or immediately after, the motor relay switch 71 will be opened to interrupt the motor circuit by the opening of one of the relay switches 103, the circuit to effect opening of the latter being as follows:—Supply main A; wire 55; common lead 104, the coil 103a of the appropriate relay switch 103, lead 108; wire 59, finger terminal 13; contact plate 1; wire 4a; switch plate 5, and lead 6 to main supply A. The cold water flowing through the open valve 20 and pipe 22 will drive the meter 23 which will in turn drive the rotary switch at a rate corresponding with the rate of flow through the meter so that if the flow is increased due to an increase of pressure at the cold water supply, or if the flow is decreased owing to a loss of head or pressure, then the rate of drive of the rotary switch will be correspondingly accelerated or retarded.

The timing motor will remain idle until the valve 20 on the cold water supply has been shut by reason of the contact finger 13 of the rotary switch reaching the end of the slot in the record card and thus breaking the circuit to de-energize the coil of the magnetic control valve 42 which then moves to a position to cut off supply of fluid under pressure to valve 20 and exhaust the conduit 44, while the circuit to the coil 103a of relay switch 103 is simultaneously broken to close the relay switch 103 and establish the circuit to the coil 71a of motor relay switch 71 to close this switch and again establish the circuit of motor 9. The rotary switch will now again be rotated at a predetermined rate by the motor 9 until one of the finger terminals 10 to 14 is brought into contact with the plate 1 through a slot in the record card. Assuming that the finger terminal 11, corresponding with the soap supply, is next brought into contact with the plate 1 through a slot in the record card 3 an electric circuit for effecting opening of the soap supply valve 28 will be established as follows:—Supply mains A; wire 6; switch plate 5; wire 4a; contact plate 1; finger terminal 11; wire 57; the coal of magnetic control valve 46; common wire 55 back to supply mains A. The coil of magnetic control valve 46 will thus be energized and effect operation of the control valve to connect the conduit 49 to the header 39 and so open the soap supply valve 28. Simultaneously, the motor relay switch 71 will be opened to interrupt the motor circuit by the opening of one of the relay switches 103 as will be clear from the previous description. Soap solution will now flow through manifold 31, this being visible through the glass front 32, through pipe 34 and will drive the meter 35 on its passage to the pipe 24. The meter 35 will in turn drive the rotary switch at a rate corresponding with the rate of flow through the meter, which is dependent upon the pressure of the soap supply, until the finger terminal 11 is disengaged from the contact plate 1 at the end of the slot in the record card. The soap supply valve will then be closed and the circuit of motor 9 re-established as will be clear from the previous description to take up the drive of the rotary switch and rotate it at the predetermined time rate.

It will thus be seen that the duration for which a liquid supply valve is open is dependent not upon a predetermined time factor but according to the measurement of the liquid which has flowed through one or other of the meters 23 or 35. The length of the slots in the record card 3 for the control of the delivery of liquid will be such as to correspond with the given number of measuring displacements of the meter which are calculated to make up the predetermined quantity of liquid desired. The control of delivery of hot water, soda and blue and control of the outlet 38 will be clear from the previous description.

It will be appreciated that other operations such as the control of rotation of the washing drum may also be embodied in the rotary switch according to known principles.

Instead of the valves 20, 21, 28, 29, 30 and 38 being operated by fluid under pressure they may be magnetic control valves directly controlled by the rotary switch and finger terminals 10 to 16.

Figure 5:
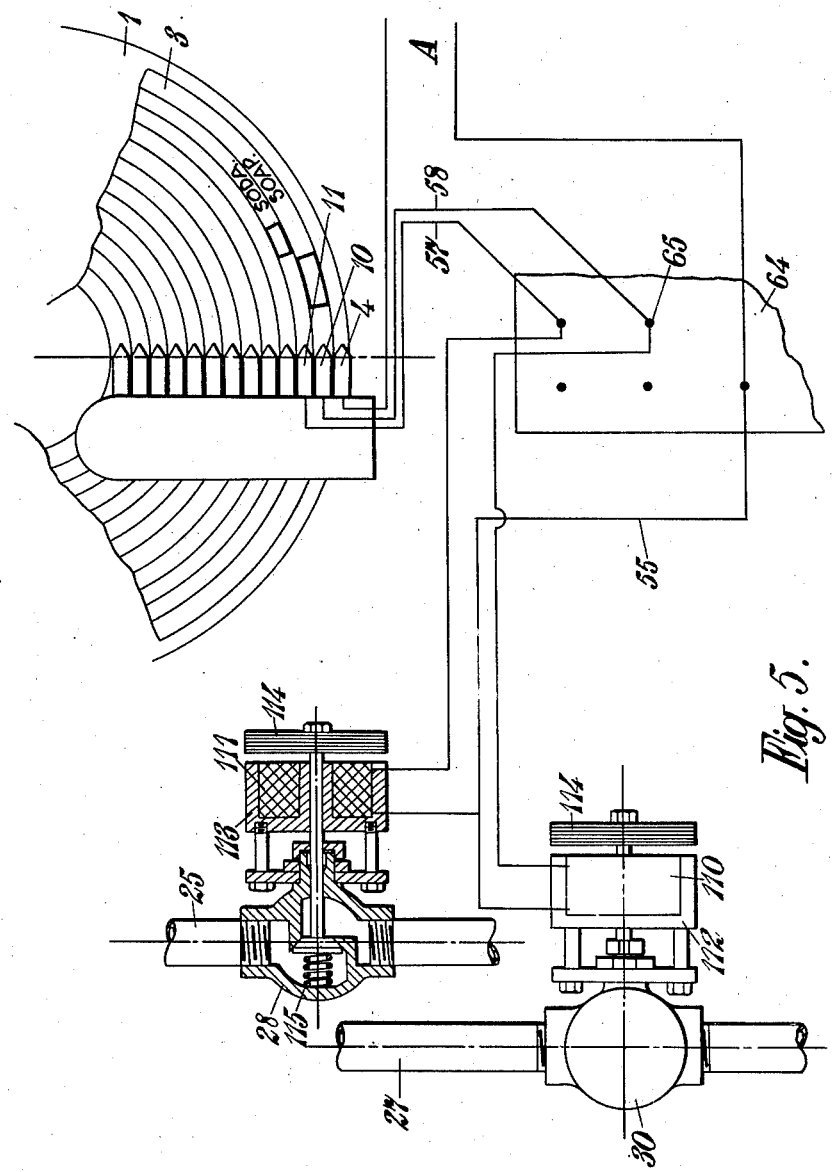
Figure 5 is a diagrammatic view illustrating magnetic control valves directly controlled by the rotary switch.

Such modified arrangement as applied by way of example to the valves 28 and 30 is illustrated in Figure 5 in which parts corresponding with those of Figure 1 are given the same reference numerals. Referring to Figure 5 it will be seen that the wires 56 and 57 connected respectively to the finger terminals 10 and 11 of the rotary switch lead to the panel 64 but instead of being connected to the solenoids of magnetic valves 47 and 46 as in Figure 1 they are connected respectively to one side of solenoids 110, 111 carried by housings 112, 113 secured to the housings of valves 30 and 28. The other side of each of these solenoids 110, 111 is connected to one side of the current supply A through common wire 55. The stem of each valve passes through the solenoid housing and is provided on its outer end with an armature 114 so that whenever one of the finger terminals 10 or 11 contacts with the plate 1 through a slot in the record card a circuit is established to effect energization of the solenoid 110 or 111 whereby armature 114 is attracted to thus open the valve against the action of the valve spring 115.

Instead of the various devices being controlled in one sense by the establishment of current in its circuit and in the other sense by the interruption of current, that is by a single finger terminal, they may be actuated in one direction or one sense through the establishment of one circuit and in the opposite sense by the establishment of another or modified circuit, in which case the operation of each device would be dependent upon a pair of finger terminals on the contact arm and a corresponding pair of slots in the record card.

Figure 6:
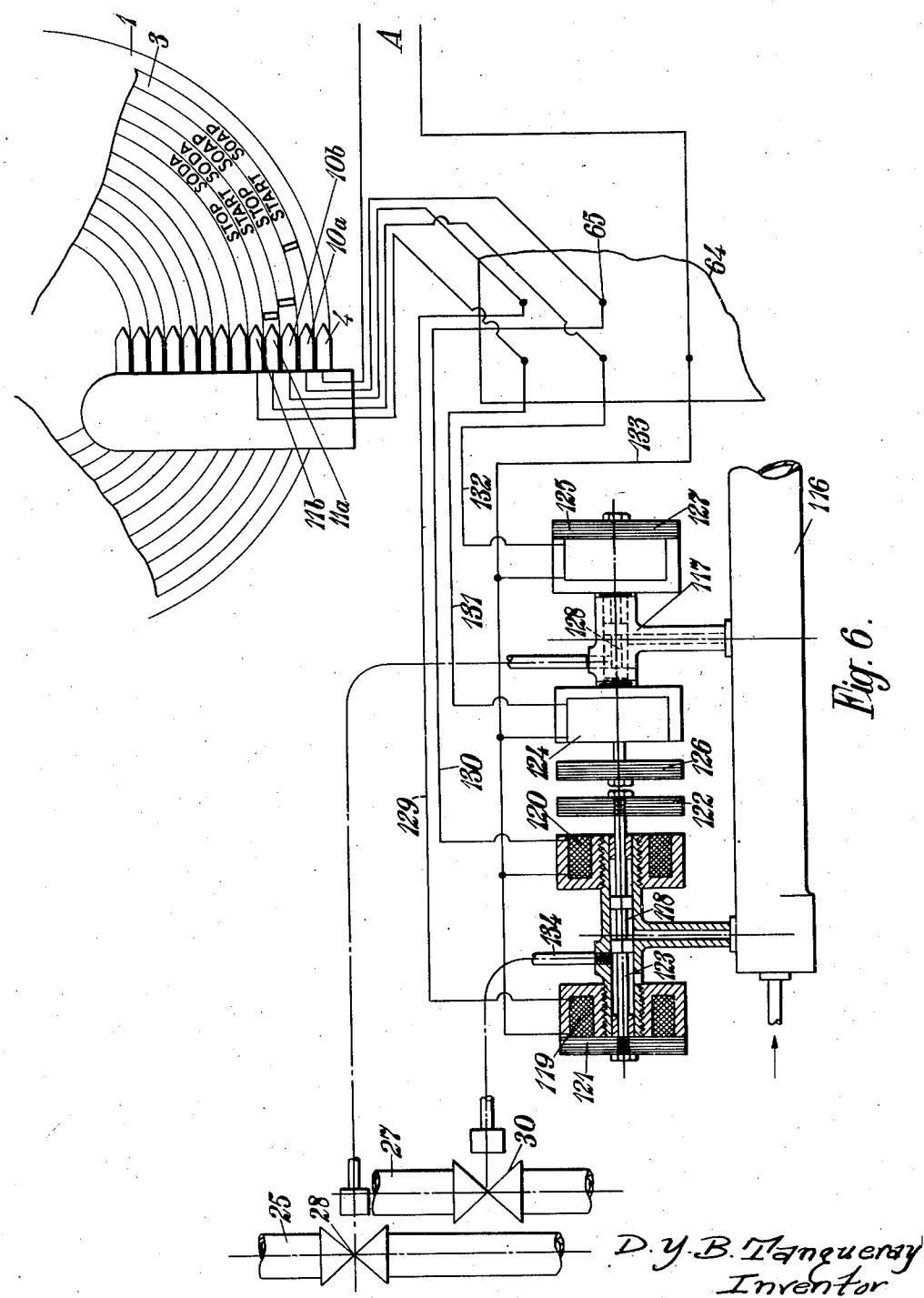
Figure 6 is a diagrammatic view illustrating a modified manner of controlling a valve through two circuits and two finger terminals controlled by the rotary switch.

This modification, also applied by way of example to the valves 28 and 30, is shown in Figure 6. As shown in this figure the supply of fluid or air under pressure from a manifold 116 to the valves 28 and 30 is under control of magnetic slide valves 117, 118, each controlled by two finger terminals of the rotary switch. The housing of the slide valve 118 carries two solenoids 119, 120 adapted to co-operate respectively with armatures 121, 122 secured on opposite ends of the valve spindle 123. Similarly, the housing of slide valve 117 carried two solenoids 124, 125 adapted to co-operate respectively with armatures 126, 127 secured on opposite ends of the valve spindle 128. One side of the solenoid 119 is connected by wire 129 to finger terminal 10$^b$ of the rotary switch, one side of solenoid 120 is connected by wire 130 to finger terminal 10$^a$, one side of solenoid 124 is connected by wire 131 to finger terminal 11$^b$ and one side of solenoid 125 is connected by wire 132 to finger terminal 11$^a$, while the other side of each of the solenoids is connected to one side of the supply mains A through common wire 133. The slide valve 118 is shown in the position in which there is no communication between the manifold 116 and conduit 134 leading to valve 30, but it will be appreciated that when finger terminal 10$^a$ contacts with the plate 1 through a slot in the record card 3 a circuit will be established through wire 130, solenoid 120 and common lead 133, thereby energizing the solenoid 120 which attracts the armature 122 and effects sliding of the valve 118 to the left to thus establish communication between the fluid pressure manifold 116 and conduit 134 to open the valve 30. Closure of this valve 30 will be effected when finger terminal 10$^b$ contacts plate 1 through another slot in the record card 3 and thus establishes a circuit to energize solenoid 119 which attracts armature 121 to move slide valve 118 to the right. Similarly valve 28 will be opened when solenoid 125 controlled by finger terminal 11$^a$ is energized to attract armature 127 and move slide valve 117 to the left while this valve 28 will be closed when solenoid 124 controlled by finger terminal 11$^b$ is energized to attract the armature 126 and move slide valve 117 to the right.

While it is preferred to employ free wheel clutches in the drives between the rotary switch and the motor and meters, these drives may have positively actuated clutches controlled by the rotary switch to change from one drive to another.

Figure 7:
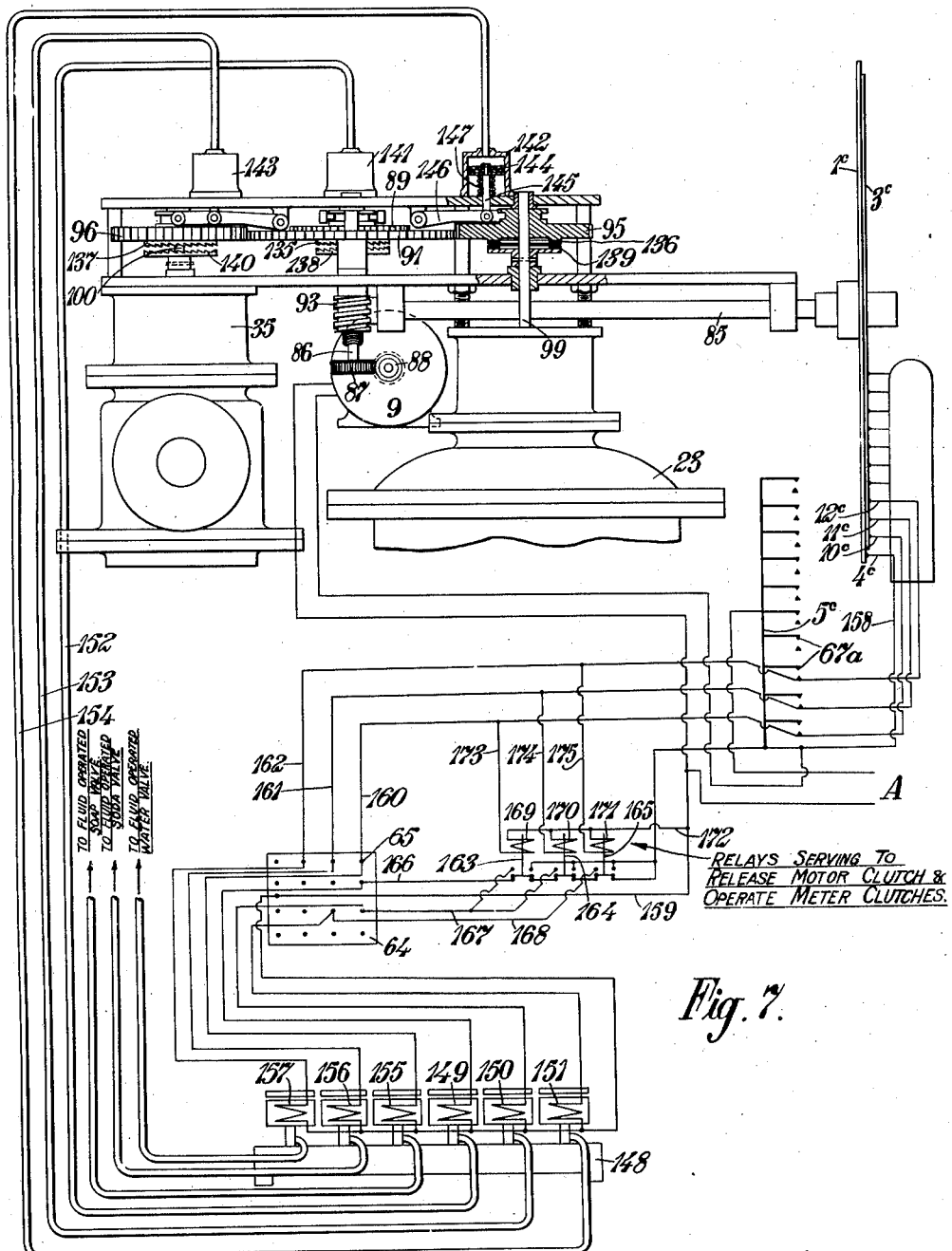
Figure 7 is a diagrammatic view illustrating positively actuated clutches in the drives between the rotary switch and the motor and meters.

Such an arrangement is shown in Figure 7 in which drive mechanism between the rotary switch and the motor and meters is similar to that previously described with reference to Figures 3 and 4 and similar parts have been given the same reference numerals. In Figure 7 the gear wheels 89, 95 and 96 which are commonly in mesh with the gear wheel 91 are slidably mounted respectively on the shaft 86, shaft 99 of meter 23 and shaft 100 of meter 35. These gear wheels 89, 95, and 96 carry respectively a clutch element 135, 136, 137 adapted to co-operate with clutch elements 138, 139, 140 fixed respectively to the shafts 86, 99 and 100. Located above the gear wheels 89, 95 and 96 are cylinders 141, 142, 143 in each of which a piston operates. One of such pistons 144 is shown in the cylinder 142, the piston rod 145 being connected to a pivoted lever 146 which has a forked end carrying rollers engaging in the groove of a part of the gear wheel 95 so that movement of the piston 144 will be transmitted to gear 95 to effect engagement and disengagement of the clutch elements 136 and 139. The piston is normally held in the upper part of the cylinder 142 by a spring 147 whereby the clutch elements 136 and 139 are normally disengaged. Similar mechanism is provided between each of the pistons in the cylinders 141, 143 and the gear wheels 89 and 96 so that movement of these pistons can effect the clutching and declutching of the gear wheels 89, 96 with respect to their respective shafts 86 and 100. The supply of fluid or air under pressure to the cylinders 141, 142 and 143 from the pressure manifold 148 is under control of magnetic valves. Thus, magnetic valve 149 controls the supply of fluid under pressure to the cylinder 141 through conduit 152, magnetic valve 150 controls the supply to cylinder 143 through conduit 153, while magnetic valve 151 controls the supply to cylinder 142 through conduit 154. Further magnetic control valves are provided which are adapted to control communication between the fluid pressure manifold 148 and fluid operated liquid supply valves, these magnetic control valves being in turn controlled by finger terminals of the rotary switch. In the present example three only of such magnetic valves are shown which are given the reference numerals 155, 156, 157. The magnetic valve 155 is adapted to control the supply of fluid under pressure to the fluid operated soap supply valve and is itself controlled by the finger terminal 10°, the magnetic valve 156 is adapted to control the supply of fluid under pressure to the fluid operated soda supply valve and is itself controlled by the finger terminal 11°, while the magnetic valve 157 is adapted to control the supply of fluid under pressure to the fluid operated water supply valve and is itself controlled by the finger terminal 12°. The finger terminal 4° which is always in contact with the plate 1° of the rotary switch is connected through wire 158 and the contact plate 5° of a series of manually operable switches 67° to one side of the supply mains A, the other side of which is connected through common wire 159 to one side of each of the solenoids of magnetic control valves shown. The other side of the solenoids of magnetic valves 155, 156, 157 are respectively connected to the finger terminals 10°, 11°, 12° through wires 160, 161, 162. The liquid supply valves are therefore controlled by the rotary switch in the manner previously described with reference to Figure 1, but provision is made in this modified form of the invention for disengaging the motor clutch 135, 138, whenever a liquid supply valve is opened and for engaging the appropriate meter clutch 136, 139 or 137, 140. Thus solenoid operated relay switches 163, 164, 165 are arranged in the wire 166 leading from the solenoid of magnetic valve 149 to one side of the supply mains A, the switches 163 and 164 being also arranged to control the circuit through wire 167 of the solenoid of the magnetic valve 150, while the relay switch 165 is also arranged to control the circuit through wire 168 of the solenoid of magnetic valve 151. The relay switches 163, 164, 165 are adapted to be operated respectively by solenoids 169, 170, 171, one side of each of which is connected to the supply mains A through common wire 172 while the other side of solenoid 169 is connected by wire 173 to the wire 160, the other side of solenoid 170 is connected by wire 174 to wire 161 and the other side of solenoid 171 is connected by wire 175 to wire 162. The relay switches are normally in the position shown in which the circuit to the solenoid of magnetic valve 149 is established so that the latter valve is opened and the motor clutch 135, 138 is engaged whereby the motor 9 drives the rotary switch at a predetermined time rate. When finger terminal 10° contacts plate 1° through a slot in the record card 3° a circuit is established through wire 160, solenoid of magnetic valve 155 and common wire 159 to the supply mains A, thus operating magnetic valve 155 to in turn cause opening of the soap supply valve. At the same time a circuit is established through wire 160, wire 173, relay solenoid 169 and common wire 172 to the supply mains A, whereby solenoid 169 is energized to operate relay switch 163 to break the circuit of the solenoid of magnetic valve 149 and establish a circuit through wire 167 and the solenoid of magnetic valve 150. Thus, magnetic valve 149 is operated to effect disengagement of the motor clutch 135, 138 while magnetic valve 150 is operated to effect engagement of the clutch parts 137, 140 whereby the meter 35 takes over the drive of the rotary switch. Similarly, if finger terminal 11° contacts plate 1°, magnetic valve 156 will be operated to open the soda supply valve and at the same time relay switch 164 will be operated to effect disengagement of the motor clutch 135, 138 and engagement of the meter clutch 137, 140, while in finger terminal 12° contacts plate 1° magnetic valve 157 will be operated to open the water supply valve and at the same time the relay switch 165 will be operated to effect operation of magnetic valves 149 and 151 whereby the motor clutch 135, 138 will be disengaged and the clutch 136, 139 engaged so that the meter 23 will drive the rotary switch.

Instead of operating the rotary switch by a flow meter such as described it may be driven when the time motor is disconnected by a rotary positive displacement pump having a constant or substantially constant delivery per revolution.

Figure 8:
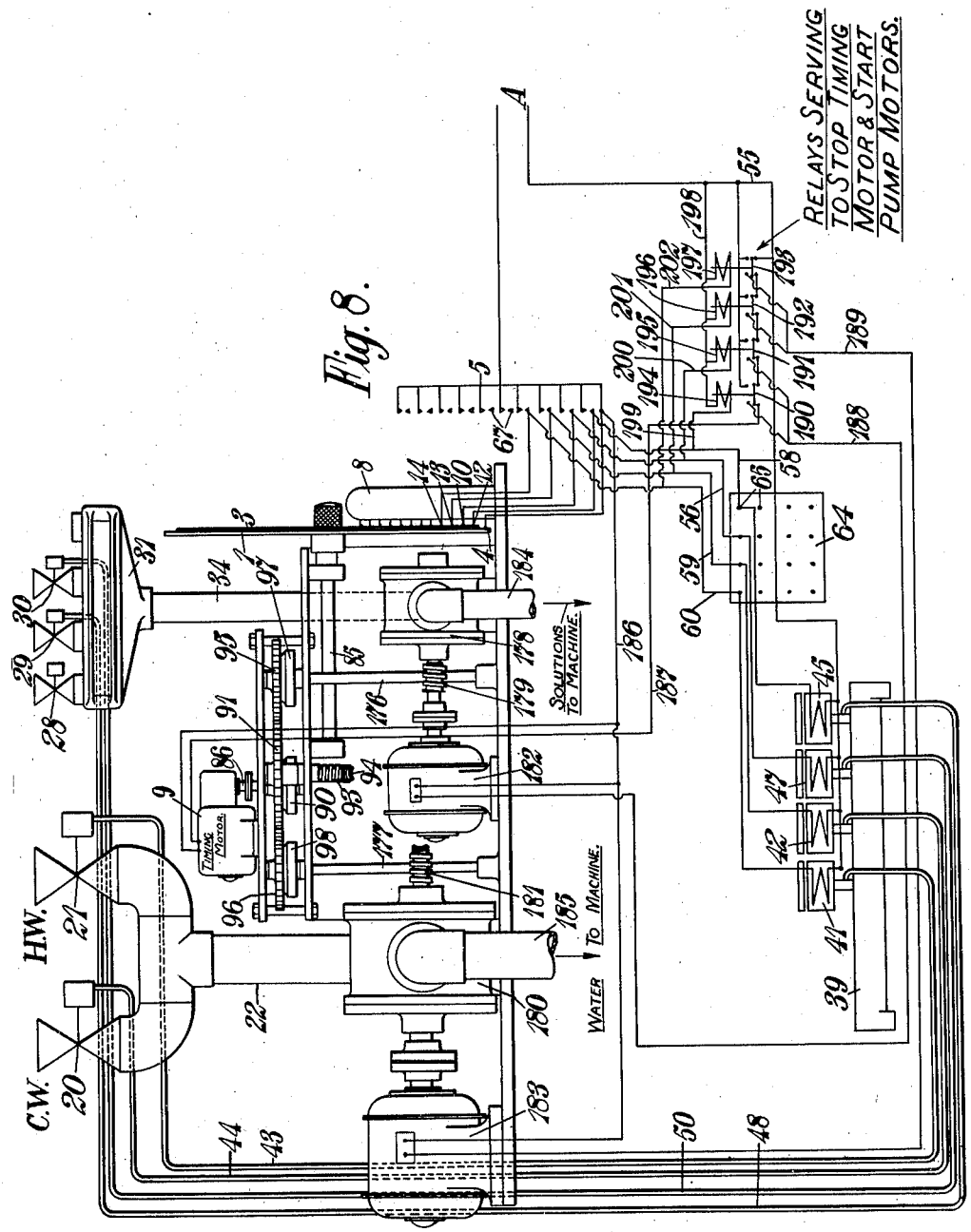
Figure 8 is a diagrammatic view of a modified form of the invention in which positive displacement pumps are utilized instead of flow meters.

Figure 8 shows an arrangement in which pumps are used instead of meters and in this figure parts which are similar to those of Figure 1 have been given the same reference numerals. The valves 20, 21, 29 and 30 are controlled respectively by the magnetic valves 42, 41, 45 and 47 which in turn are controlled respectively by the finger terminals 14, 13, 12 and 10 of the rotary switch all in the same manner as described with reference to Figure 1 and therefore further description thereof is unnecessary. The driving mechanism for driving the rotary switch is similar to that described with reference to Figures 3 and 4 and similar parts thereof have been given the same reference numerals. However, the gear wheels 95 and 96 are adapted to be driven respectively through the free wheel clutches 97 and 98 from vertical shafts 176 and 177. The shaft 176 is adapted to be driven by a constant delivery pump 178 through worm gearing 179 while the shaft 17 is adapted to be driven by a constant delivery pump 180 through worm gearing 181, these pumps being arranged to be driven by electric motors 182 and 183 respectively. The inlet side of the pump 178 is connected by the pipe 34 to the common manifold 31 through which the washing solutions, such as soap, soda and blue, are delivered under control of supply valves 28, 29 and 30, while the outlet pipe 184 is adapted to lead to the washing machine. The inlet side of the pump 180 is connected by the pipe 22 to the water supply pipes on the delivery side of the supply valves 20 and 21 and the outlet pipe 185 of this pump is also adapted to be connected to the washing machine. Provision is made for cutting out the timing motor 9 whenever a liquid supply valve is opened and for simultaneously starting the appropriate pump motor so that the pump can drive the rotary switch at a rate corresponding with the rate of delivery of the liquid. One side of each of the timing motor 9 and the pump motors 182 and 183 is connected through a common lead 186 and switch plate 5 to one side of the supply mains A. The other side of motor 9 is connected through lead 187 and common lead 55 to the other side of the supply mains A, the other side of the pump motor 182 is connected through lead 188 and common lead 55 to the supply mains A, while the other side of the pump motor is connected through lead 189 and common lead 55 to the supply mains A. Interposed in the lead 187 of the timing motor 9 are solenoid operated relay switches 190, 191, 192 and 193 which are double acting, the first two being also arranged in the lead 188 of the pump motor 182 and the latter two being arranged in the lead 189 of the pump motor 183, the arrangement being such that whenever a relay switch is operated the timing motor circuit will be broken while one or other of the pump motor circuits will be made or vice versa. The relay switches 190, 191, 192 and 193 are adapted to be operated respectively by solenoids 194, 195, 196 and 197 one side of each of which is connected through common lead 198 to one side of the supply mains A. The other side of the solenoid 194 is connected by wire 199 to the wire 58, that of solenoid 195 is connected by wire 200 to wire 56, that of solenoid 196 is connected by wire 201 to wire 59, while the other side of the solenoid 197 is connected by wire 202 to wire 60. Normally, with the solenoids 194 to 197 deenergized, the relay switches are in the position in which the circuit of the timing motor 9 is established through lead 187 whereby the motor 9 drives the rotary switch at a predetermined time rate. When, for example, the finger terminal 12 is brought into contact with the plate 1 through a slot in the record card 3 a circuit is established through wire 58, the solenoid of magnetic valve 45, common lead 55 to supply mains A, whereby magnetic valve 45 is operated to effect opening of the soda supply valve 29. Simultaneously, a circuit is established through wire 58, wire 199, relay switch solenoid 194, common lead 198 to the supply mains A, thus energizing the solenoid 194 and causing relay switch 190 to open the circuit of the timing motor 9 by breaking the lead 187 and to close the circuit through lead 188 of the pump motor 182. This pump motor is thus started to drive the pump 184 while the timing motor 9 is rendered inoperative. Similarly, if finger terminal 10 contacts the plate 1 through a slot in the record card 3, solenoids 47 and 195 will be energized to cause the blue supply valve 30 to be opened and the pump motor 182 to be operated while the timing motor is rendered inoperative. If on the other hand, the finger terminal 13 or finger terminal 14 is brought into contact with the plate 1 through a slot in the record card 3, the solenoids 42 and 196 or solenoids 41 and 197 will be energized thus causing water supply valve 20 or 21 to be opened while pump motor 183 and pump 180 will be rendered operative and the timing motor 9 rendered inoperative.

The switch may be driven by the movements of a float in a float chamber associated with the washing drum in the case of the water supply, and from a float in a chamber associated with the supply of the various other liquids.

Figure 9:
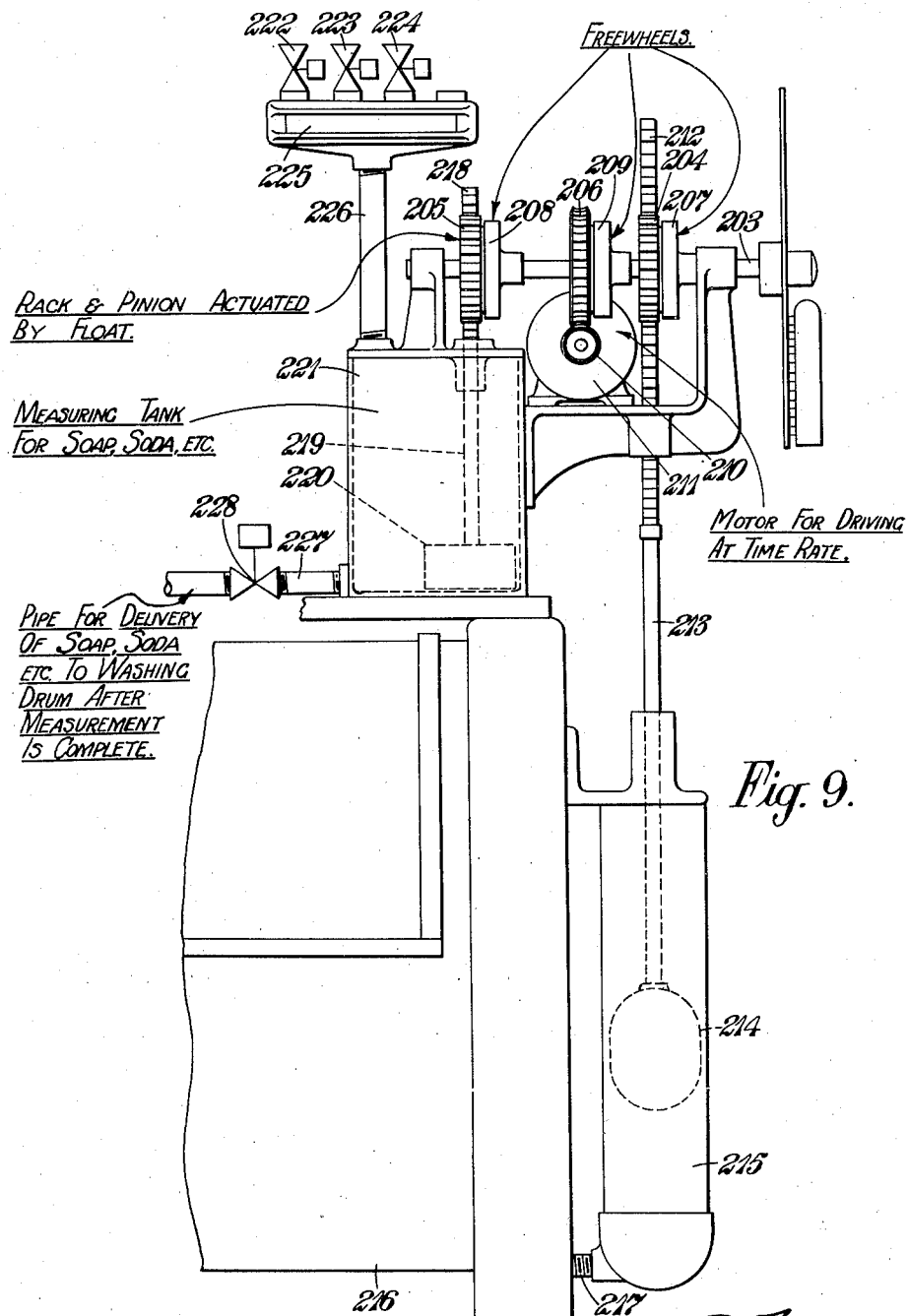
Figure 9 is a further modification in which the measuring devices for driving the rotary switch consist of floats located in chambers.

As shown in Figure 9 the spindle 203 of the rotary switch has freely mounted thereon two pinions 204 and 205 and a worm wheel 206 which are adapted respectively to drive the spindle 203 through freewheel clutches 207, 208 and 209. The worm wheel 206 meshes with a worm 210 secured on a shaft of a motor 211 adapted normally to drive the rotary switch at a predetermined time rate. Co-operating with the pinion 204 is a rack 212 carried by a spindle 213 of a float 214 located in a chamber 215 associated with the washing drum 216. The bottom of the chamber 215 is in communication with the washing drum through a pipe 217 so that a quantity of the water delivered to the washing drum will flow into the float chamber 215 and will rise therein corresponding with the rise of water in the washing drum. The pinion 205 co-operates with a rack 218 carried by the spindle 219 of a float 220 located in a tank or chamber 221. The various washing solutions, such as soap, soda and blue, are adapted to be delivered under control of supply valves 222, 223, and 224 to the tank 221 through a common manifold 225 and a pipe 226, the supply valves being controlled by the rotary switch in the manner previously described. Leading from the tank 221 is a delivery pipe 227 through which the solutions, after measurement in the tank, are adapted to be delivered to the washing drum under control of a valve 228 which is controlled by the rotary switch to open and close at the appropriate times. In operation, the motor 211 normally drives the rotary switch through pinion 206 and freewheel clutch 209 at a predetermined time rate until a slot in the record card causes a circuit to be established through one of the finger terminals of the rotary switch and one of the supply valves to be opened, as previously described. Assuming that a water supply valve is opened, the motor 211 will be rendered inoperative also as previously described, and water will be delivered directly to the washing drum 216 and will rise therein causing a corresponding rise in level in the float chamber 215. Hence, the float 214 will rise and through the rack 212, pinion 204, freewheel clutch 207 and spindle 203, the rotary switch will be driven at a rate corresponding with the rate of flow of the water to the washing drum 216 until the predetermined quantity of water has been delivered, whereupon the water supply valve will be closed under control of the rotary switch and the timing motor 211 will again be brought into operation. Assuming now that a quantity of washing solution is to be delivered, the appropriate valve 222, 223 or 224 is opened under control of the rotary switch and the motor 211 rendered inoperative. Solution is delivered through manifold 225 and pipe 226 to the tank 221, the float 220 rising in response to the liquid delivered to the tank 221 and driving the rotary switch through rack 218, pinion 205, freewheel clutch 208 and spindle 203 at a rate corresponding with the rate of delivery of the solution until the predetermined quantity of solution has been delivered, whereupon the solution supply valve 222, 223 or 224 is closed, the motor 211 is again started into operation and the valve 228 is opened under control of the rotary switch to effect delivery of the measured quantity of solution to the washing drum 216.

I claim:

1. In an automatic control for a washing machine or the like for controlling delivery of predetermined quantities of liquid, a rotary control device for initiating and terminating liquid delivery operations, means for driving the control device at a predetermined time rate to initiate a liquid delivery operation, a second means for driving said control device after initiation of a liquid delivery operation at a rate corresponding with the rate of delivery of liquid and means for rendering said first driving means inoperative whilst said second driving means is operative.

2. In an automatic control for a washing machine or the like for controlling delivery of predetermined quantities of liquid, a rotary control device for initiating and terminating liquid delivery operations, driving means for driving the said rotary control device at a predetermined time rate to initiate a liquid delivery operation, a second driving means for driving said control device after initiation of a liquid delivery operation at a rate corresponding with the rate of delivery of the liquid, and means for rendering said first driving means inoperative upon initiation of a liquid delivery operation.

3. In an automatic control for a washing machine or the like for controlling delivery of predetermined quantities of liquid, a rotary control device for initiating and terminating liquid delivery operations, driving means for driving said control device at a predetermined time rate to initiate a liquid delivery operation, a measuring device operable upon initiation of a liquid delivery operation and in accordance with the flow of liquid, driving means between the measuring device and the said control device, and means for rendering said first mentioned driving means inoperative when a liquid delivery operation has been initiated.

4. In an automatic control for a washing machine or the like for controlling delivery of predetermined quantities of liquid, a rotary control device for initiating and terminating liquid delivery operations, a motor, driving means between said motor and said control device for driving said control device at a predetermined time rate to initiate the liquid delivery operation, a metering device operable by the flow of liquid therethrough when a liquid delivery operation has been initiated, driving means between said metering device and said control device, and means for rendering the said motor inoperative upon a liquid delivery operation being initiated.

5. In an automatic control for washing machines or the like for controlling delivery of predetermined quantities of liquid, a rotary control device for controlling the initiation and termination of liquid delivery operations, driving means including a clutch for driving said control device at a predetermined time rate to initiate liquid delivery operations, means for rendering said driving means inoperative upon a liquid delivery operation being initiated, a flow meter operated by the flow of liquid therethrough when liquid delivery has been initiated, and driving means including a clutch between said flow meter and said control device for driving said control device at a rate corresponding with the rate of flow of the liquid through the said meter.

6. In an automatic control for washing machines or the like for controlling delivery of predetermined quantities of liquid, a liquid supply pipe, a valve in said supply pipe, a rotary control device for controlling the opening and closing of said valve, means for driving said control device at a predetermined time rate until said valve has been opened, a measuring device located in said supply pipe and operable by the flow of liquid therethrough, and driving means between said measuring device and said control device whereby the control device is driven by said measuring device at a rate corresponding with the rate of delivery of the liquid whilst said valve is open.

7. In an automatic control for washing machines or the like for controlling delivery of predetermined quantities of liquid, a liquid supply pipe, a valve in said supply pipe, a rotary control device for controlling the opening of said valve for initiating and terminating the delivery of liquid through said supply pipe, means for driving said control device at a predetermined time rate, a metering device in said supply pipe and operable by the flow of liquid therethrough when said valve is open, driving means between said metering device and said control device for driving said control device whilst said valve is open at a rate corresponding with the rate of flow through said metering device, and means for rendering said first mentioned driving means inoperative upon said valve being opened.

8. In an automatic control for washing machines or the like for controlling delivery of predetermined quantities of liquid, a liquid supply pipe, a valve in said supply pipe, a rotary control device for controlling the opening of said valve for initiating and terminating delivery of liquid, a motor, driving means between said motor and said control device for driving the control device at a predetermined time rate until the valve is opened, means for rendering the motor inoperative upon the valve being opened, a flow meter in said supply pipe on the delivery side of said valve and operable by the flow of liquid therethrough, and driving means between said flow meter and said control device for driving said control device whilst said valve is open at a rate corresponding with the rate of flow through said meter.

9. In an automatic control for washing machines or the like for controlling delivery of predetermined quantities of liquid, a liquid supply pipe, a valve in said supply pipe, a rotary control device for controlling the opening of said valve for initiating and terminating liquid delivery operations, a motor, driving means including a free wheel clutch between said motor and said control device for driving the latter at a predetermined time rate until the valve is opened, means for rendering the motor inoperative when said valve is opened, a flow meter operable by the flow of liquid through said supply pipe when the valve is open, and driving means including a free wheel clutch between said flow meter and the control device for driving said control device at a rate corresponding with the rate of delivery of the liquid.

10. In an automatic control for washing machines or the like for controlling delivery of predetermined quantities of liquid, a liquid supply pipe, a valve in said supply pipe, a rotary electric switch, a circuit controlled by said switch for controlling the opening of said valve for initiating and terminating liquid delivery operations, means for driving said rotary electric switch at a predetermined time rate until it effects closure of said circuit to open the said valve, means for rendering said driving means inoperative when the valve is opened, a metering device in said supply pipe and operable by the flow of liquid therethrough, and driving means between said metering device and said control device whereby said metering device drives said control device while the valve is open at a rate corresponding with the rate of flow of the liquid through the meter.

11. In an automatic control for a washing machine or the like for controlling delivery of predetermined quantities of liquid, a liquid supply pipe, a valve in said supply pipe, a rotary electric switch, a circuit controlled by said rotary electric switch for controlling the opening of said valve for initiating and terminating liquid delivery operations, an electric motor, driving means between said motor and the rotary electric switch for driving said switch at a predetermined time rate until said circuit is closed to open said valve, an electric circuit for said motor, means controlled by said valve opening circuit for opening said motor circuit, a flow meter in said supply pipe operable by the flow of liquid therethrough when said valve is open, and driving means between said flow meter and said rotary electric switch for driving the latter at a rate corresponding with the rate of flow of liquid through said flow meter.

12. In an automatic control for a washing machine or the like for controlling delivery of predetermined quantities of liquid, a plurality of liquid supply pipes, a valve in each of said supply pipes, a rotary electric control device, for controlling the opening and closing of said valves for initiating and terminating liquid delivery operations, an electric motor, a circuit for said motor including a switch, driving means including a clutch between said motor and said control device for driving the latter at a predetermined time rate until a valve is opened by said control device, means for opening said motor switch to render the motor inoperative upon any one of said valves being opened by said control device, a metering device through which passes liquid delivered through said supply pipes, and driving means including a clutch between said metering device and said control device whereby said metering device drives said control device at a rate corresponding with the rate of flow through said metering device.

13. In an automatic control for a washing machine or the like for controlling liquid delivery operations, the combination of a rotary control device comprising a contact disc, a spindle on which said disc is secured and a gear wheel secured to said spindle, of means for driving said control device comprising a motor, driving means including a free-wheel clutch between said motor and said gear wheel, a flow meter, and driving means including a free-wheel clutch between said flow meter and said gear wheel for driving said control device when said motor is inoperative.

14. In an automatic control for a washing machine or the like for controlling liquid delivery operations, the combination of a rotary control device comprising a contact plate, a horizontally disposed spindle on which said disc is secured, and a worm wheel secured on said spindle, with driving means for said control device comprising a vertical shaft, a worm on said vertical shaft in mesh with said worm wheel, a gear wheel secured to said vertical shaft, a motor, driving means including a free wheel clutch between said motor and said gear wheel, a liquid metering device, driving means including a free wheel clutch between said metering device and said gear wheel, and means for rendering said motor inoperative whilst said metering device is operative.

15. In an automatic control for a washing machine or the like for controlling liquid delivery operations, a plurality of liquid supply pipes, a plurality of valves one in each of said pipes, a rotary electric control device, a plurality of electrical circuits one for each valve controlled by said control device, an electric motor, driving means between said motor and said control device, an electric circuit for said motor including a relay operated switch, means for energizing said relay to open said switch and render the motor inoperative whenever any one of said valve operating circuits is established, a liquid flow meter operable by liquid flowing therethrough from any of said liquid supply pipes, and driving means between said flow meter and said control device to drive said control device by the flow meter at a liquid delivery rate whilst said motor is inoperative.

16. In an automatic control for a washing machine for controlling liquid delivery operations the combination of a rotary control device, a pipe for water supply, a flow meter in said water supply pipe, a pipe for supply of washing solutions, a flow meter in said washing solution supply pipe, a motor, driving means including a free wheel clutch between said rotary control device and each of said flow meters and motor, and means for rendering the motor inoperative whilst either of said flow meters is in operation.

DAVID YEO BARTHOLOMEW TANQUERAY.